(12) United States Patent
Higuchi

(10) Patent No.: US 9,207,815 B2
(45) Date of Patent: *Dec. 8, 2015

(54) INPUT DEVICE AND METHOD OF MANUFACTURING THE SAME

(75) Inventor: Shinichi Higuchi, Niigata-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 161 days.

This patent is subject to a terminal disclaimer.

(21) Appl. No.: 13/401,750

(22) Filed: Feb. 21, 2012

(65) Prior Publication Data

US 2012/0249451 A1    Oct. 4, 2012

(30) Foreign Application Priority Data

Mar. 29, 2011    (JP) ................... 2011-072495

(51) Int. Cl.
*G06F 3/041* (2006.01)
*B05D 5/00* (2006.01)
*B05D 5/12* (2006.01)
*G06F 3/044* (2006.01)

(52) U.S. Cl.
CPC ...................... *G06F 3/044* (2013.01)

(58) Field of Classification Search
None
See application file for complete search history.

(56) References Cited

U.S. PATENT DOCUMENTS

| 7,030,860 | B1 | 4/2006 | Hsu et al. |
| 8,537,135 | B2 | 9/2013 | Chih-Yung et al. |
| 2009/0096759 | A1 | 4/2009 | Nishiwaki et al. |
| 2009/0140987 | A1 | 6/2009 | Yang |
| 2010/0283762 | A1 | 11/2010 | Takusa |
| 2011/0109590 | A1* | 5/2011 | Park ............... 345/174 |
| 2011/0169751 | A1* | 7/2011 | Kim et al. ........... 345/173 |
| 2011/0234520 | A1* | 9/2011 | Chan ............... 345/173 |
| 2011/0254778 | A1 | 10/2011 | Wang et al. |
| 2011/0279402 | A1 | 11/2011 | Yoo et al. |
| 2011/0298728 | A1* | 12/2011 | Kim et al. ........... 345/173 |
| 2012/0068960 | A1* | 3/2012 | Kim et al. ........... 345/174 |
| 2012/0098782 | A1 | 4/2012 | Nam |

FOREIGN PATENT DOCUMENTS

| EP | 2090966 | 8/2009 | |
| EP | 2124137 A1 * | 11/2009 | ............ G06F 3/041 |
| JP | 2007-18226 | 1/2007 | |
| JP | 2009-193587 | 8/2009 | |
| JP | EP 2 124 137 A1 * | 11/2009 | ............ G06G 3/041 |
| JP | 2009-301767 | 12/2009 | |

(Continued)

OTHER PUBLICATIONS

Zhang et al.; Strong, Transparent, Multifunctional, Carbon Nanotube Sheets; Science Aug. 19, 2005: 309 (5738), 1215-1219. [DOI:10.1126/science.1115311].*

(Continued)

*Primary Examiner* — Kathy Wang-Hurst
*Assistant Examiner* — Douglas Wilson
(74) *Attorney, Agent, or Firm* — Beyer Law Group LLP

(57) ABSTRACT

A touch panel includes a transparent panel, a transparent electrode which is formed in a transparent input region on a first surface of the transparent panel, a decorative layer which is formed in a decorative region on the first surface, a wiring layer which is formed on a surface of the decorative layer, and a transparent conductive connection layer which electrically connects the wiring layer and the transparent electrode.

11 Claims, 4 Drawing Sheets

(56) References Cited

FOREIGN PATENT DOCUMENTS

| | | |
|---|---|---|
| JP | 2010-182137 | 8/2010 |
| WO | WO 2009/157645 A1 * 12/2009 | .................. 345/174 |

OTHER PUBLICATIONS

David Heche, Transparent Carbon Nanotube Films Likely Successor to ITO for Commercial Applications, Apr. 2009, http://phys.org/news158587561.html.*

Notice of Reasons for Rejection dated May 1, 2012 from Japanese Application No. 2011-072496.

Office Action dated Oct. 15, 2013 from U.S. Appl. No. 13/402,774.

Zhang et al., "Strong, Transparent, Multifunctional, Carbon Nanotube Sheets", Science, vol. 309, p. 1215-1219, Aug. 19, 2005.

Office Action dated Aug. 7, 2014 from U.S. Appl. No. 13/402,774.

Notice of Reasons for Rejection dated May 1, 2012 from Japanese Application No. 2011-072495.

* cited by examiner

INPUT DEVICE AND METHOD OF MANUFACTURING THE SAME

CLAIM OF PRIORITY

This application claims benefit of Japanese Patent Application No. 2011-072495 filed on Mar. 29, 2011, which is hereby incorporated by reference.

BACKGROUND OF THE INVENTION

1. Field of the Invention

The present invention relates to an input device (touch panel which is used in combination with a liquid crystal display or the like, and a method of manufacturing the same.

2. Description of the Related Art

As described in Japanese Unexamined Patent Application Publication No. 2009-301767, a touch panel includes a transparent surface panel (transparent substrate 23), a decorative layer (light-shielding layer 24) which is formed in a decorative region below the surface panel, a transparent planarizing layer (overcoat layer 25) which is formed over the entire region of the lower surfaces of the surface panel and the decorative layer, and transparent electrodes (transparent conductive layer 26) which are formed in the lower surface of the planarizing layer, and the like.

In Japanese Unexamined Patent Application Publication No. 2009-301767, transparent resin, such as photosensitive acrylic resin is spin-coated to form the planarizing layer.

However, in the configuration in which the planarizing layer is formed of a resin layer by spin coating, in particular, the degree of planarization of the planarizing layer is degraded due to a step between the surface panel and the decorative layer, or the like. For this reason, there is a problem in that the transparent electrodes may not be formed on the planarized surface, causing deterioration in sensor sensitivity.

In Japanese Unexamined Patent Application Publication No. 2009-301767, since a planarizing layer is necessary, the touch panel increases in thickness, and there is a problem in that it is difficult to appropriately achieve a reduction in thickness.

In a touch panel described in Japanese Unexamined Patent Application Publication No. 2009-193587, a decorative layer (mask layer 12), a planarizing layer (smoothing layer 15), and transparent electrodes (sensing circuit 13) are laminated in a decorative region below a surface panel (single substrate 11). Accordingly, there are the same problems as those in Japanese Unexamined Patent Application Publication No. 2009-301767.

SUMMARY OF THE INVENTION

The present invention provides a thin input device having satisfactory sensor sensitivity and a method of manufacturing the same.

An input device according to an aspect of the invention includes a transparent base material, a transparent electrode which is formed in a transparent input region on a first surface of the transparent base material, a decorative layer which is formed in a decorative region on the first surface, a wiring layer which is formed on the surface of the decorative layer, and a transparent conductive connection layer which electrically connects the wiring layer and the transparent electrode.

A method of manufacturing an input device according to another aspect of the invention includes the steps of forming a transparent electrode in a transparent input region on a first surface of a transparent base material, forming a decorative layer in a decorative region on the first surface of the transparent base material, forming a wiring layer on the surface of the decorative layer, and coating or printing transparent conductive ink between the wiring layer and the transparent electrode to electrically connect the wiring layer and the transparent electrode by a transparent conductive connection layer made of the transparent conductive ink.

According to the aspects of the invention, both the decorative layer and the transparent electrode are formed on the same first surface of the transparent base material. According to the aspects of the invention, since the wiring layer is formed on the surface of the decorative layer, there is no case where the wiring layer appears in the transparent input region. According to the aspects of the invention, the transparent electrode and the wiring layer are electrically connected to each other by the transparent conductive connection layer separately from the transparent electrode, thereby obtaining stable electrical characteristics. While the transparent electrode and a portion of the transparent conductive connection layer appear in the transparent input region, all of them are transparent, and thus the transmission property is not problematic. According to the aspects of the invention, the transparent electrode and the wiring layer are connected by the transparent conductive connection layer, thereby forming the decorative layer at the minimum width necessary for wiring the wiring layer and effectively extending the input region.

As described above, according to the aspects of the invention, since the transparent electrode can be formed on the same flat first surface as the decorative layer, the transparent electrode can be formed on the planarized surface compared to a case where the transparent electrode is formed on the surface of the planarizing layer formed by spin coating or the like, thereby obtaining excellent sensor sensitivity. Unlike the related art, since it is not necessary to form the planarizing layer, it is possible to realize reduction in thickness compared to the related art.

According to the aspects of the invention, since the transparent conductive connection layer can be formed by coating or printing transparent conductive ink, it is possible to electrically connect the transparent electrode and the wiring layer by the transparent conductive connection layer simply and reliably.

The transparent conductive ink may be PEDOT-containing ink.

The transparent base material may be a transparent panel whose surface becomes an operating surface. Accordingly, it is possible to minimize the distance between the operating surface of the transparent electrode, to obtain high sensor sensitivity, and to effectively promote reduction in thickness of the input device.

Plurality of the transparent electrode may have a single-layer structure, thereby effectively promoting reduction in thickness of the input device.

According to the aspects of the invention, since the transparent electrode can be formed on the same flat first surface as the decorative layer, the transparent electrode can be formed on the planarized surface compared to a case where the transparent electrode is formed on the surface of the planarizing surface formed by spin coating, thereby obtaining excellent sensor sensitivity. Unlike the related art, since it is not necessary to form the planarizing layer, it is possible to realize reduction in thickness compared to the related art. Transparent conductive ink is coated or printed between the wiring layer and the transparent electrode, and the wiring layer and the transparent electrode are electrically connected by the transparent conductive connection layer made of the transparent conductive ink, thereby simply and reliably connecting the wiring layer and the transparent electrode and effectively extending the transparent input region.

DESCRIPTION OF THE PREFERRED EMBODIMENTS

Figure 1:
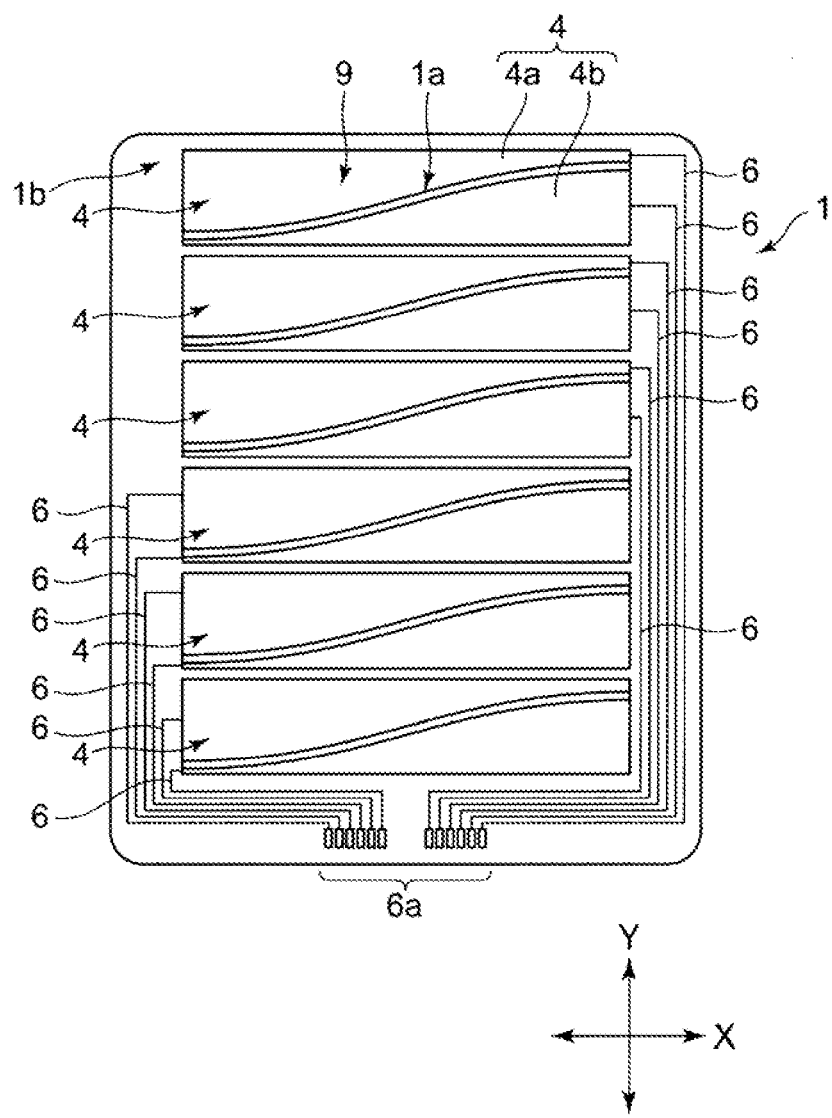
FIG. 1 is a plan view of a capacitance type touch panel (input device) in this embodiment.
Figure 2A:
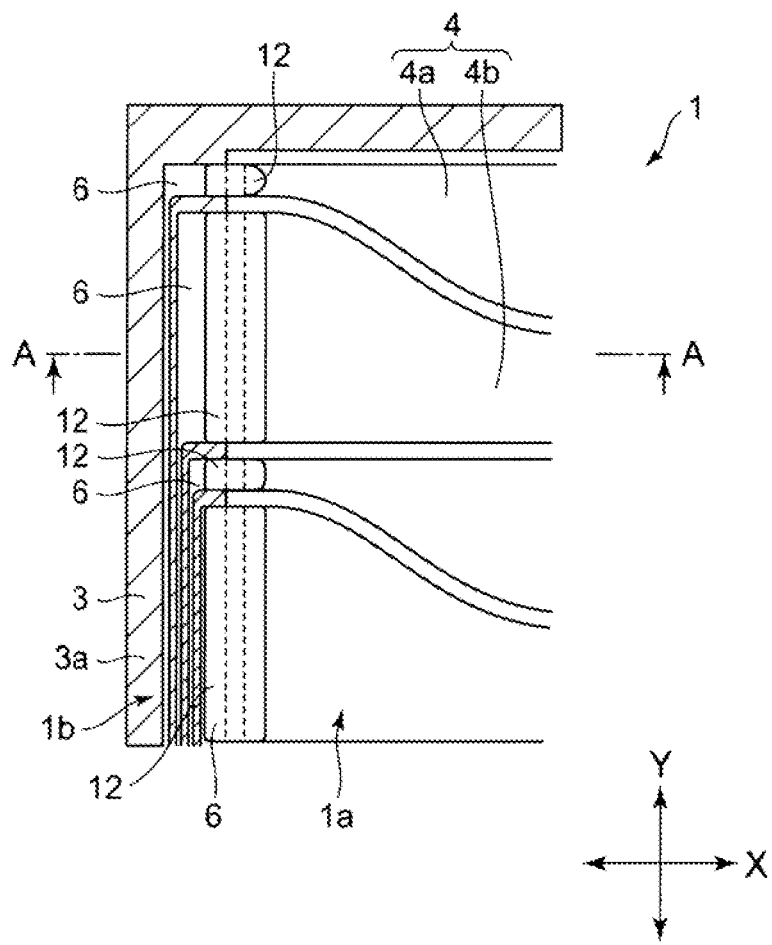
FIG. 2A is a partial enlarged rear view of a portion of the touch panel shown in FIG. 1 on a magnified scale.

FIG. 1 is a plan view of a capacitance type touch panel (input device) in this embodiment. FIG. 2A is a partial enlarged rear view showing a portion of the touch panel shown in FIG. 1 on a magnified scale, and FIG. 2B is a partial enlarged longitudinal sectional view of the touch panel shown in FIG. 2A when taken along the line A-A and viewed in the direction of the arrow.

A touch panel 1 of this embodiment has a transparent panel 5 in a surface layer, a decorative layer 3, transparent electrodes 4, wiring layers 6, transparent conductive connection layers 12, and the like.

The terms "transparent" and "transmission property" used herein refers to a state where visible light transmittance is equal to or greater than 60% (preferably, equal to or greater than 80%). It is preferable that the haze value is equal to or smaller than 6.

Figure 2B:
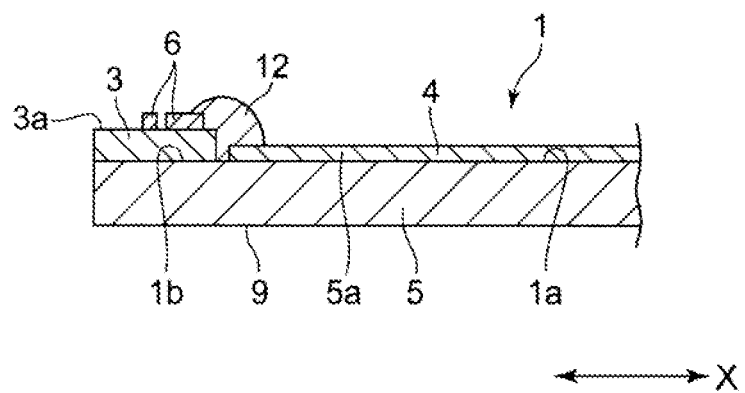
FIG. 2B is a partial enlarged longitudinal sectional view of the touch panel shown in FIG. 2A when taken along the line A-A and viewed in the direction of the arrow.

FIG. 2A is a rear view, and FIG. 2B which is a longitudinal sectional view of FIG. 2A shows a state where the transparent panel 5 in the layer is on the lower side. Accordingly, in FIG. 2B, the lower surface of the transparent panel 5 is an operating surface 9.

The transparent panel 5 is formed of glass, transparent plastic, or the like, and the material is not particularly limited. The transparent panel 5 may have a flat shape as a whole or may be a housing shape.

As shown in FIG. 2B, the transparent electrodes 4 are formed in a transparent input region 1a on a first surface (a rear surface opposite to the operating surface 9) 5a of the transparent panel 5. As shown in FIG. 1, the transparent input region 1a is provided over the wide range at the center of the touch panel 1. In this embodiment, the transparent input region 1a has, but is not limited to, a rectangular shape.

As shown in FIG. 1, the transparent electrodes 4 each have a pair of a first transparent electrode 4a and a second transparent electrode 4b separately formed, and a plurality of sets are formed at an interval in the Y direction. In this embodiment, although the shapes of the first transparent electrode 4a and the second transparent electrode 4b are not limited, the first transparent electrode 4a and the second transparent electrode 4b are formed to change in width in the Y direction gradationally or in a stepwise manner toward the X direction.

The transparent electrodes 4 are formed by sputtering or depositing a transparent conductive material, such as ITO (Indium Tin Oxide), and patterned using a photolithography technique to have the shape shown in FIG. 1.

As shown in FIG. 1, the wiring layers 6 are formed to extend from the end portions in the X direction of the first transparent electrodes 4a and the second transparent electrodes 4b.

As shown in FIG. 1, the wiring layers 6 are extended and formed in a decorative region 1b surrounding the periphery of the transparent input region 1a. As described below, since the decorative layer 3 is formed in the decorative region 1b, unlike FIG. 1, the wiring layers 6 are not actually visible from the operating surface 9 of the touch panel 1. Meanwhile, in FIG. 1, the wiring layers 6 are visible through the decorative layer 3.

As shown in FIGS. 2A and 2B, the colored decorative layer 3 is formed in the decorative region 1b on the first surface 5a of the transparent panel 5. In FIG. 2A, a hatched portion is the region having the decorative layer 3 formed therein which is visible from the rear surface.

As shown in FIG. 1, the decorative region 1b is provided in a shape surrounding the periphery of the transparent input region 1a. The decorative layer 3 is formed by, for example, screen printing. The decorative region 1b in which the decorative layer 3 is formed is non-transmissive, and the transparent input region 1a is transmissive. Although any material can be used for the decorative layer 3, when the decorative layer 3 is conductive, it is necessary to form an insulating layer to overlap the entire surface 3a of the decorative layer 3. Although the insulating layer is non-transmissive or transmissive, when the insulating layer spreads out of the lateral surface of the decorative layer 3 into the transparent input region 1a, the insulating layer is transparent.

As shown in FIGS. 2A and 2B, a plurality of wiring layers 6 are printed on the surface 3a of the decorative layer 3. The number of wiring layers 6 is equal to the number of transparent electrodes 4a and 4b.

The term "the surface 3a of the decorative layer 3" used herein refers to a surface which corresponds to the rear surface of the touch panel 1 when viewed from the operating surface 9 or corresponds to the lower surface if the operating surface 9 turns toward the upper surface.

The wiring layers 6 are formed of a metal material, such as Ag, Cu, Cu alloy, Al, Mo, CuNi alloy, or Ni. For example, the wiring layers 6 are formed by printing Ag paste.

The wiring layers 6 are wired in the surface 3a of the decorative layer 3 and, as shown in FIG. 1, are packed together in a portion which is connected to a flexible printed board (not shown). The tips of the wiring layers 6 form an external connection portion 6a which is electrically connected to the flexible printed board (not shown).

As shown in FIGS. 2A and 2B, the wiring layers 6 and the transparent electrodes 4a and 4b are electrically connected to each other the transparent conductive connection layers 12.

The transparent conductive connection layers 12 are formed by coating or printing transparent conductive ink. As the transparent conductive ink, PEDOT-containing (for example, PEDOT/PSS (polyethylenedioxythiophene/polyethylene sulfonate)) conductive ink may be presented.

Though not shown in FIG. 2B, a hard coat film (transparent protective film) may be adhered to the exposed surfaces of the transparent electrodes 4, the transparent conductive connection layers 12, and the wiring layers 6 through an optical transparent adhesive layer (OCA).

In the touch panel 1 shown in FIGS. 1, 2A, and 2B, if the operator touches or approaches the operating surface 9 of the transparent panel 5 in the surface layer of the touch panel 1 with his/her finger, capacitance between the first transparent electrodes 4a close to the finger and the second transparent electrodes 4b close to the finger changes. Thus, it is possible to calculate the operating position of the finger on the basis of the change in capacitance.

Figure 3:
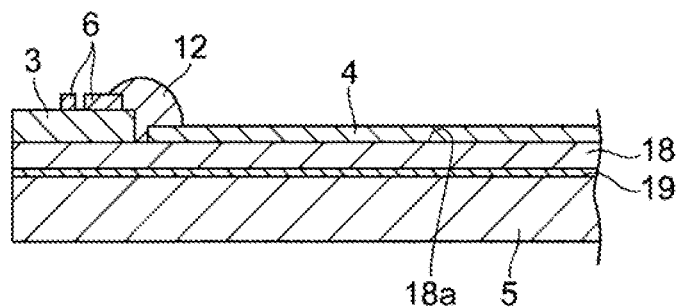
FIG. 3 is a partial enlarged longitudinal sectional view of a touch panel in another embodiment different from FIG. 2B.

As shown in FIG. 3, a structure may be made in which a decorative layer 3 and transparent electrodes 4 are formed on a first surface 18a of a transparent base material 18, such as a PET film, and a transparent panel 5 made of glass or transparent plastic is adhered to a second surface 18b (a surface opposite to the first surface 18a) of the transparent base material 18 through an optical transparent adhesive layer (OCA) 19. Meanwhile, as shown in FIG. 2, if the decorative layer 3 and the transparent electrodes 4 are formed on the transparent panel 5 in the surface layer, it is possible to reduce the number of components and to achieve reduction in thickness of the touch panel 1 and improvement in sensor sensitivity.

Figure 4:
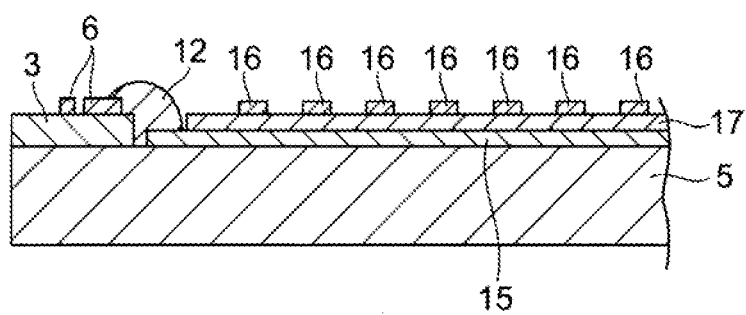
FIG. 4 is a partial enlarged longitudinal sectional view of a touch panel in another embodiment different from FIG. 2B.

In a touch panel shown in FIG. 4, a laminated structure is made in which two layers of transparent electrodes 15 and 16 are laminated through a transparent insulating layer 17. At this time, for example, a plurality of transparent electrodes 15 extend in the X direction at an interval in the Y direction, and a plurality of transparent electrodes 16 extend in the Y direction at an interval in the X direction.

In FIG. 4, while the transparent electrodes 15 and the wiring layers 6 are electrically connected to each other by the transparent conductive connection layers 12, the transparent electrodes 16 may be connected to the wiring layers 6 (not shown) by the transparent conductive connection layers 12 at positions.

Meanwhile, in this embodiment, as shown in FIGS. 1, 2A, and 2B, the transparent electrodes 4 can have a single-layer structure, thus it is possible to promote reduction in thickness of the touch panel 1.

FIGS. 5A to 5D are process views showing a method of manufacturing the touch panel 1 of this embodiment.

Figure 5A:
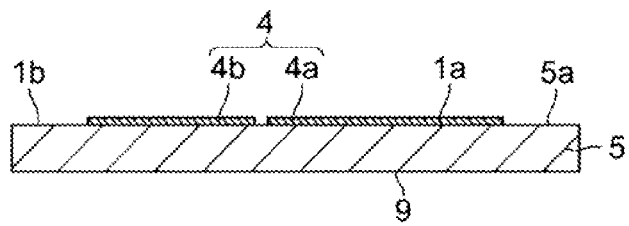
FIGS. 5A to 5D are process views (longitudinal sectional views) showing a method of manufacturing a touch panel in this embodiment.

In the step of FIG. 5A, the transparent electrodes 4 are formed on the first surface 5a of the transparent panel 5. In this embodiment, the material for the transparent panel 5 is not particularly limited. While the first surface 5a of the transparent panel 5 is a flat surface, the operating surface 9 may not be flat. The transparent panel 5 may form a portion of the housing.

The transparent electrodes 4 are formed by forming a transparent conductive material, such as ITO, on the entire first surface 5a using sputtering or deposition and patterning the transparent conductive material using a photolithography technique. While the transparent electrodes 4 are patterned in the transparent input region 1a to have the shape shown in FIG. 1, the transparent conductive film in the decorative region 1b may be removed by etching. That is, in FIG. 2B or 5, while the transparent conductive film formed in the decorative region 1b is completely removed, even if the transparent conductive film partially remains in the decorative region 1b, there is no problem unless the transparent conductive film remaining in the decorative region 1b is electrically connected to the transparent electrodes 4 and the transparent conductive connection layers 12 which will be formed in a subsequent step.

Figure 5B:
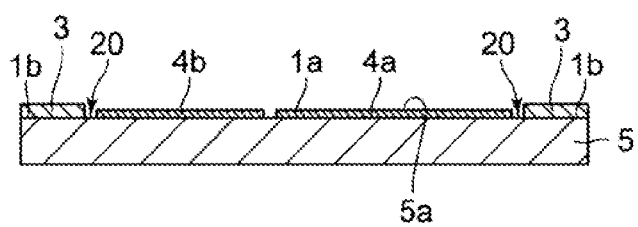

Next, in the step shown in FIG. 5B, the decorative layer 3 is screen-printed in the decorative region 1b on the first surface 5a of the transparent panel 5. At this time, in FIG. 5B, while a slight interval 20 is left between the transparent electrodes 4 and the decorative layer 3, the interval 20 may not be left. For example, the transparent electrodes 4 may be formed to extend to the decorative region 1b, and the transparent electrodes 4 may partially overlap the decorative layer 3.

Accordingly, it becomes possible to use a portion of the decorative region 1b as the input region.

Figure 5C:
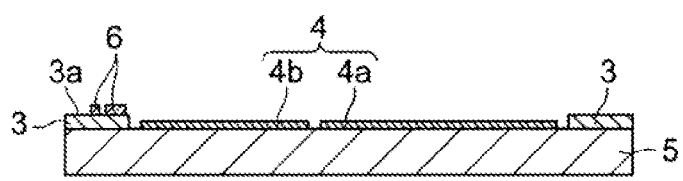

Next, in the step of FIG. 5C, a plurality of wiring layers 6 are screen-printed on the surface 3a of the decorative layer 3.

Figure 5D:
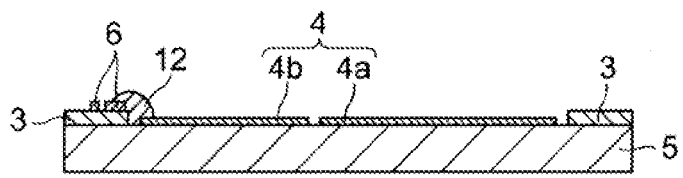

Next, in the step of FIG. 5D, transparent conductive ink is coated or printed between the wiring layers 6 and the transparent electrodes 4a and 4b to electrically connect the wiring layers 6 and the transparent electrodes 4 by the transparent conductive connection layers 12 made of the transparent conductive ink.

In this embodiment, both the decorative layer 3 and the transparent electrodes 4 are formed on the same first surface 5a of the transparent panel 5. In this embodiment, since the wiring layers 6 are formed on the surface 3a of the decorative layer 3, the wiring layers 6 do not appear in the transparent input region 1a. In this embodiment, the transparent electrodes 4 and the wiring layers 6 are electrically connected to each other by the transparent conductive connection layers 12 separately from the transparent electrodes 4, thereby obtaining stable electrical characteristics. While the transparent electrodes 4 and a portion of the transparent conductive connection layers 12 appear in the transparent input region 1a, all of them are transparent, and thus the transmission property is not problematic. In this embodiment, the transparent electrodes and the wiring layers are connected to each other by the transparent conductive connection layers 12, thereby forming the decorative layer 3 at the minimum width necessary for wiring the wiring layers 6 and effectively extending the transparent input region 1a.

As described above, in this embodiment, since the transparent electrodes 4 can be formed on the same flat first surface 5a as the decorative layer 3, the transparent electrodes can be formed on the planarized surface compared to a case where the transparent electrodes are formed on the surface of the planarizing layer formed by spin coating or the like, thereby obtaining excellent sensor sensitivity. Unlike the related art, since it is not necessary to form the planarizing layer, it is possible to realize reduction in thickness compared to the related art.

In this embodiment, for example, PEDOT-containing transparent conductive ink is coated or printed to form the transparent conductive connection layers 12. The thickness of the decorative layer 3 is about several μm to several tens of μm, and the thickness of the transparent electrodes 4 made of ITO or the like is about several Å to several tens of Å. While the difference in thickness between the decorative layer 3 and the transparent electrodes 4 is significant, it is possible to electrically connect the decorative layer 3 and the transparent electrodes 4 simply and reliably by coating or printing the transparent conductive ink.

The touch panel 1 of this embodiment is a capacitance type, and a liquid crystal display (LCD) (not shown) is arranged on the rear side of the touch panel 1 (the side opposite to the operating surface 9). The display form of the liquid crystal display can be viewed from the transparent input region 1a of the touch panel 1, and in this embodiment, the operator can carry out an input operation while viewing a display form in the transparent input region 1a.

The touch panel (input device) of this embodiment is used in mobile phones, digital cameras, PDAs, game machines, car navigation systems, or the like.

It should be understood by those skilled in the art that various modifications, combinations, sub-combinations and alterations may occur depending on design requirements and other factors insofar as they are within the scope of the appended claims of the equivalents thereof.

What is claimed is:

1. An input device comprising:
    a transparent panel having a first surface and a second surface opposite to the first surface, the second surface being an operating surface;
    a transparent electrode which is formed on the first surface in a transparent input region of the transparent panel;
    a decorative layer formed on the first surface in a decorative region surrounding the transparent input region such that a gap is formed between the transparent electrode and the decorative layer in a direction parallel to the first surface and that the transparent electrode does not overlap the decorative layer, the decorative layer having a thickness greater than a thickness of the transparent electrode;
    a wiring layer formed on a surface of the decorative layer; and
    a transparent conductive connection layer which electrically connects the wiring layer and the transparent electrode, the transparent conductive connection layer being formed by coating or printing transparent conductive ink independently from the transparent electrode, the transparent conductive connection layer extending from an end portion of the transparent electrode onto the decorative layer so as to fill the gap and cover a part of the wiring layer formed on the decorative layer such that the decorative layer, the wiring layer, and the transparent conductive connection layer form a three-layer lamination structure in which the transparent conductive connection layer is formed on top of the wiring layer on the decorative layer formed on the first surface, the transparent conductive connection layer having a thickness greater than the thickness of the decorative layer,
    wherein the decorative layer is not light-transmissive and formed between the transparent panel and the wiring layer.

2. The input device according to claim 1,
    wherein the transparent conductive ink is PEDOT-containing ink.

3. The input device according to claim 1,
    wherein the transparent electrode includes a plurality electrodes which have a single-layer structure.

4. A method of manufacturing an input device, the method comprising:
    forming a transparent electrode on a first surface of a transparent panel in a transparent input region thereof, the transparent panel having a second surface opposite to the first surface, the second surface being an operating surface;
    forming a decorative layer on the first surface in a decorative region of the transparent panel surrounding the transparent input region, such that a gap is formed between the transparent electrode and the decorative layer in a direction parallel to the first surface and that the transparent electrode does not overlap the decorative layer, the decorative layer having a thickness greater than a thickness of the transparent electrode and not being light-transmissive;
    forming a wiring layer on a surface of the decorative layer, the decorative layer being disposed between the transparent panel and the wiring layer; and
    coating or printing transparent conductive ink between the wiring layer and the transparent electrode to form a transparent conductive connection layer that electrically connects the wiring layer and the transparent electrode, the transparent conductive connection layer extending from an end portion of the transparent electrode onto the decorative layer so as to fill the gap and cover a part of the wiring layer formed on the decorative layer, such that the decorative layer, the wiring layer, and the transparent conductive connection layer form a three-layer lamination structure in which the transparent conductive connection layer is formed on top of the wiring layer on the decorative layer formed on the first surface, the transparent conductive connection layer having a thickness greater than the thickness of the decorative layer,
    wherein the coating or printing the transparent conductive ink is performed after forming the transparent electrode, the decorative layer, and the wiring layer.

5. The method according to claim 4,
    wherein the transparent conductive ink is PEDOT-containing ink.

6. The method according to claim 4,
    wherein the forming the transparent electrode includes forming a plurality of electrodes on the first surface with a single-layer structure.

7. The input device according to claim 1,
    wherein the transparent conductive connection layer is formed of transparent conductive ink coated or printed over an edge portion of the transparent electrode and a part of the wiring layer.

8. The input device according to claim 1, wherein the decorative layer is provided such that the wiring layer is not visible from the operating surface of the input device.

9. The input device according to claim 1, wherein the thickness of the transparent conductive connection layer is greater than a total thickness of the decorative layer and the wiring layer.

10. The method according to claim 4, wherein the decorative layer is provided such that the wiring layer is not visible from the operating surface of the input device.

11. The method according to claim 4, wherein the thickness of the transparent conductive connection layer is greater than a total thickness of the decorative layer and the wiring layer.

* * * * *